Patented June 26, 1928.

1,674,923

UNITED STATES PATENT OFFICE.

CARL SCHNORF, OF ZURICH, AND FRITZ HEFTI, OF ALTSTETTEN, NEAR ZURICH, SWITZERLAND.

PROCESS FOR THE PRODUCTION OF CARBOHYDRATE-ACRIDINE COMPOUNDS AND SOLUTIONS THEREOF.

No Drawing. Application filed October 23, 1924, Serial No. 745,492, and in Germany April 12, 1924.

In modern antiseptics, which come into consideration more particularly for internal disinfection of human and animal organisms, certain coloring matters play a prominent part (Trypaflavin, Rivanol, Trypan red and others). These coloring matters have the disadvantage that solutions thereof can be kept unchanged for a short time only and that frequently only very dilute solutions can be produced as they can only be dissolved with difficulty. The solutions must therefore be freshly prepared before use which in practice is not only an unmistakable difficulty but when the prescriptions for solution are not rigidly followed great danger is attached thereto when administered.

It has now been found possible to convert chemico-therapeutical preparations of the above character into concentrated, durable solutions which, for example, are brought on the market in phials and before use can be diluted in the simplest manner by the necessary quantity of sterilized water. This result is attained in that, for dissolving the particular acridine derivative or its salt a carbo-hydrate or a mixture of a number of carbo-hydrates is added to the water, whilst after, substances such as glycerine, kitchen salt, hydrochloric acid and so forth, according to the purpose of use, may be added without affecting the solubility or the durability. In this manner it is possible to produce readily, isotonic solutions of the said chemico-therapeutic substances which was impossible hitherto.

From a therapeutical point of view the solutions of the said antiseptics produced with the assistance of carbo-hydrates, as has been found by experiment, possess extraordinarily favorable and partly entirely novel valuable actions, which were not exhibited by the solutions hitherto used.

It has now been found that acridine derivatives with carbo-hydrates pass surprisingly easily into new compounds which are capable of being isolated and chemically characterized as unitary bodies. In comparison with acridine derivatives (Rivanol, Trypaflavin and so forth) hitherto used, the new products possess considerable advantages amongst which are: considerable resistance to light and air both in substance and in solution, easy solubility in water even in the presence of salts of the most varied character, elimination of undesirable irritating effects in hypodermic and intravenous injections, slight poisonous character, and so forth.

*Example.*—The finely powdered mixture of 289 parts 2-ethoxy-6.9-diamino acridine hydrochloride and 180 parts galactose is heated in 5000 parts 90% alcohol on the water bath under flux. In the course of about 1½ hours a complete solution takes place in the boiling alcohol; after a further quarter of an hour the new compound begins to separate from this solution partly as crust on the walls of the vessel, partly as a loose powder. The heating in the water bath is continued until the separation does not increase, which indicates the termination of the process. After cooling the product is collected on a filter and crystallized from methyl-alcohol for the purpose of purification. According to the concentration and other conditions of this purification the product is separated in the form of more powder, or crystallizes together with methyl alcohol in transparent spherical crystals, which, as a whole, have a jelly-like appearance. The subsequent drying of the substance is preferably effected first with moderate heating in free air and finally, for the removal of the last traces of solvent adhering obstinately thereto, in vacuo. The pure product thus obtained is, in the form of a bright yellow powder very readily soluble in water, fairly readily in hot methyl alcohol, slightly in ethyl alcohol and very slightly or not at all in the remaining organic solvents. When the substance is heated in combustion tubes beyond 180° it becomes slowly of a darker color with increasing sintering, so as to fuse suddenly at 208–209° whilst frothing. The elementary analysis, which involves extraordinary difficulties when carried out, in combination with the determination of the molecular weight, indicates that the new compound has been formed by the bringing together of 1 molecule each of 2-ethoxy-6.9-diamino acridine hydrochloride and galactose with the separation of one molecule of water, therefore corresponding with the gross formula:

$$C_{21}H_{26}N_3O_6Cl.$$

The new compounds can be obtained direct in solutions, ready for use, from their components in the following simple manner:—

*Example.*—400 grams of milk sugar are dissolved in 600 grams of boiling water and filtered. To the clear filtrate are added 100 grams of 2-ethoxy-6.9-diamino acridine hydrochloride, and boiled nearly to the point of formation of the solution and again filtered. To the cold filtrate is added a mixture of 75 grams glycerine, 25 grams normal hydrochloric acid and 100 grams of water, when the solution is ready for filling phials.

*Example.*—200 grams of galactose are dissolved in 900 grams of boiling water, filtered and 100 grams of 2-ethoxy-6.9-diamino acridine hydrochloride dissolved in the clear filtration.

According to our method, only carbohydrates with an aldehyde group are applicable. In the examples galactose and milk sugar are referred to. However, the carbohydrate mannose, glucose, etc., and maltose react in the same manner. Cane sugar is active also, when it is inverted during the process. In the foregoing specification the practically most important case of "rivanol" is selected of the aminoacridine compounds, although other, for example nine-aminoacridine compounds, react with sugar in the same manner.

What we wish to secure by U. S. Letters Patent is:—

1. Carbohydrate-acridine compounds, composed of carbohydrates containing an aldehyde group in their molecule and aminoacridine compounds.

2. Carbohydrate-acridine compounds, composed of a carbohydrate containing an aldehyde group in its molecule and an aminoacridine compound, in suspension of a solvent.

3. Carbohydrate-acridine compounds, composed of a carbohydrate containing an aldehyde group in its molecule and an aminoacridine compound in alcohol.

4. Carbohydrate-aminoacridine compounds being crystalline solids, very soluble in water, non-irritating and possessing valuable therapeutic properties.

5. 2-ethoxy-6,9-diamino-acridine-galactose hydrochloride being a yellow crystalline solid, melting at 208–209° C. under decomposition, very soluble in water and not alterable in water solution by alkali- or salt-solutions.

In witness whereof we affix our signatures.

Dr. CARL SCHNORF.
Dr. FRITZ HEFTI.